United States Patent
Kotlarski

(10) Patent No.: US 6,581,237 B1
(45) Date of Patent: Jun. 24, 2003

(54) WIPER BLADE FOR MOTOR VEHICLE WINDOWS

(75) Inventor: Thomas Kotlarski, Bad Neuenahr (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/509,394
(22) PCT Filed: Jul. 1, 1999
(86) PCT No.: PCT/DE99/02021
§ 371 (c)(1), (2), (4) Date: May 31, 2000
(87) PCT Pub. No.: WO00/06431
PCT Pub. Date: Feb. 10, 2000

(30) Foreign Application Priority Data

Jul. 27, 1998 (DE) .......................... 198 33 666

(51) Int. Cl.$^7$ ................ B60S 1/38; B60S 1/40
(52) U.S. Cl. .................. 15/250.32; 15/250.43
(58) Field of Search ............. 15/250.43, 250.32, 15/250.44, 250.33, 250.361, 250.48, 250.451

(56) References Cited

U.S. PATENT DOCUMENTS

| | | | | | |
|---|---|---|---|---|---|
| 3,179,969 A | * | 4/1965 | Glynn | ........... | 15/250.32 |
| 3,192,551 A | * | 7/1965 | Appel | ........... | 15/250.43 |
| 3,317,945 A | * | 5/1967 | Ludwig | ........... | 15/250.361 |
| 3,390,416 A | * | 7/1968 | Scinta | ........... | 15/250.32 |
| 3,785,002 A | | 1/1974 | Quinlan et al. | | |

FOREIGN PATENT DOCUMENTS

| | | | | |
|---|---|---|---|---|
| CA | 721443 | * 11/1965 | ........... | 15/250.32 |
| DE | 44399 | * 7/1956 | ........... | 15/250.32 |
| DE | 1 505 357 | 5/1969 | | |
| DE | 1 247 161 | 1/1970 | | |
| EP | 0 591 063 | 4/1994 | | |
| WO | 98 04443 A | 2/1998 | | |
| WO | 98 19899 A | 5/1998 | | |

* cited by examiner

Primary Examiner—Gary K. Graham
(74) Attorney, Agent, or Firm—Michael J. Striker

(57) ABSTRACT

A wiper blade (10) is proposed that serves to clean windows (30) of motor vehicles. The wiper blade has a bandlike, elongated, spring-elastic support element (12) for an elongated rubber-elastic wiper element (32) that can be pressed against the window and is disposed on the lower band face oriented toward the window and is oriented longitudinally parallel to the support element, and having a coupling part (16) toward the wiper blade, positioned on the upper band face of the support element remote from the window, for pivotably connecting the wiper blade (10) to a counterpart coupling part (18) belonging to a reciprocatingly driven wiper arm (20), in which the pivot axis (40) located in the longitudinal center portion of the support element is disposed substantially transversely to the longitudinal extent of the wiper blade (10), and the coupling part (16) with its flat underside is oriented toward the upper band face of the support element. This particularly effective wiping is achieved even with problematic window curvatures, if support element (12) is curved over its entire length such that the center portion of the support element (12), resting unstressed on the window (30), is farther away from the window than its two end portions, and if furthermore that the contact face (80) between the support element (12) and the underside of the coupling part (16), measured in the longitudinal direction of the wiper blade, is less than 1.5 times the maximum width (68) of the support element (12).

19 Claims, 4 Drawing Sheets

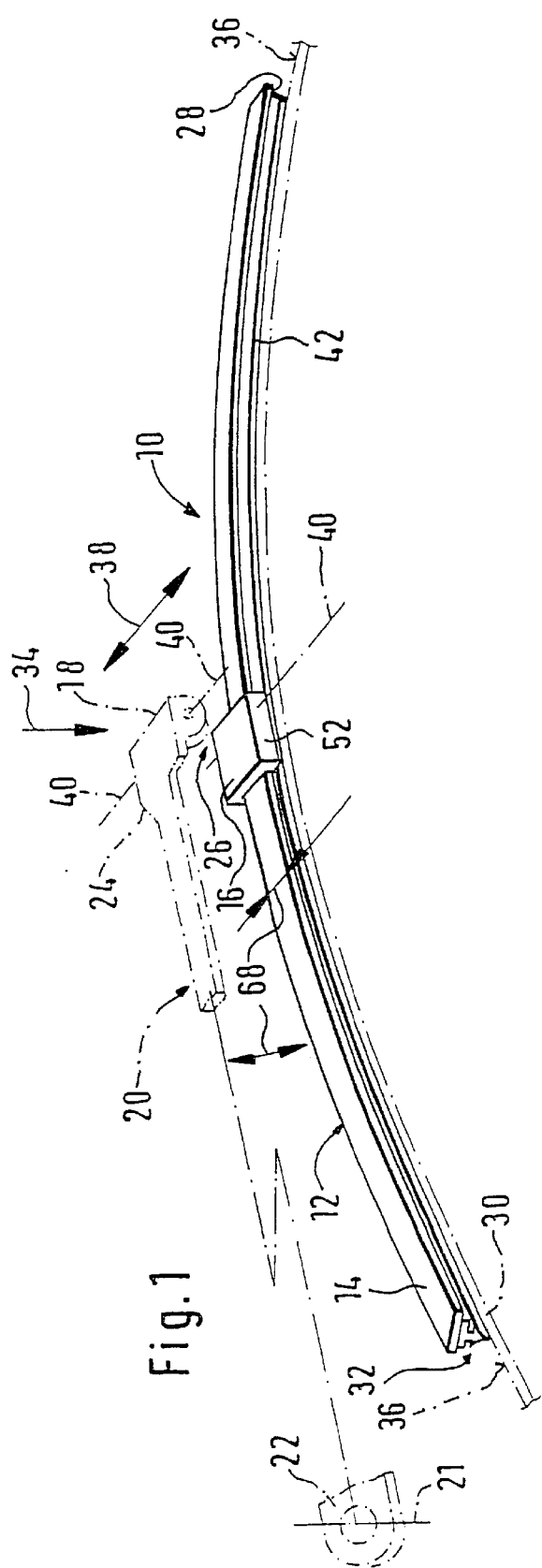
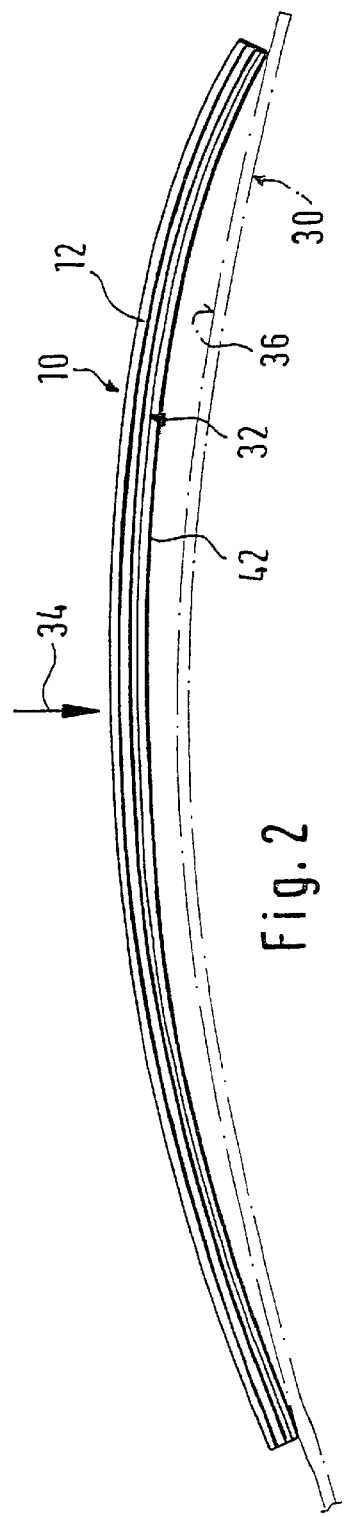

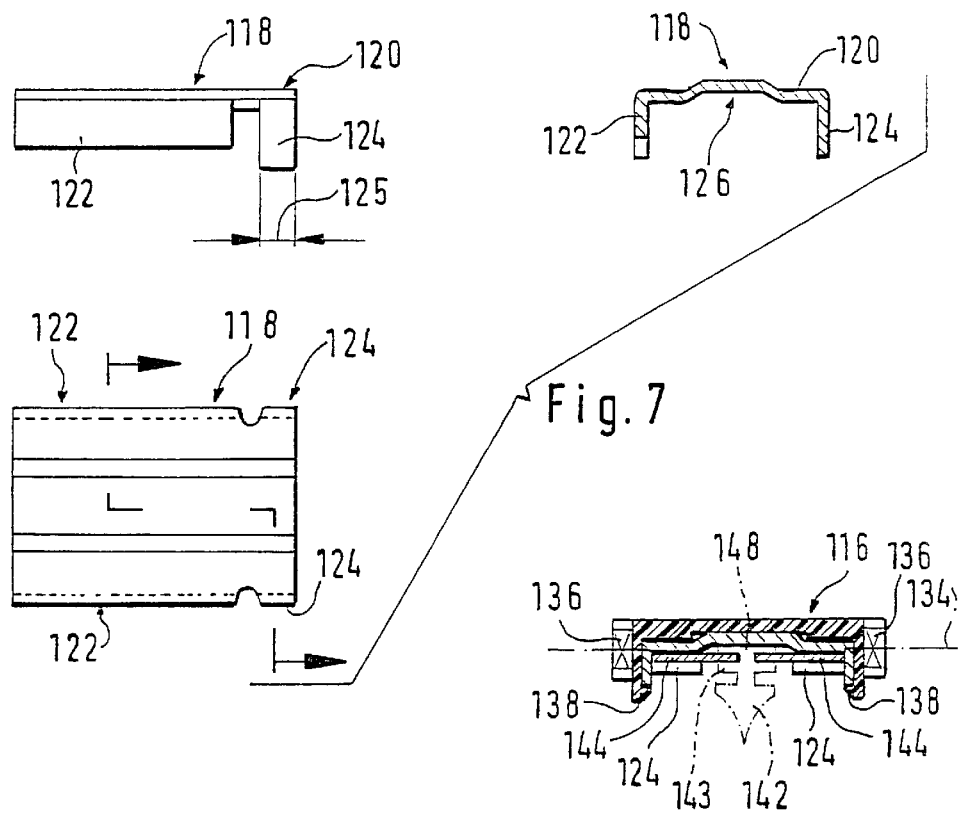
Fig. 7
Fig. 8
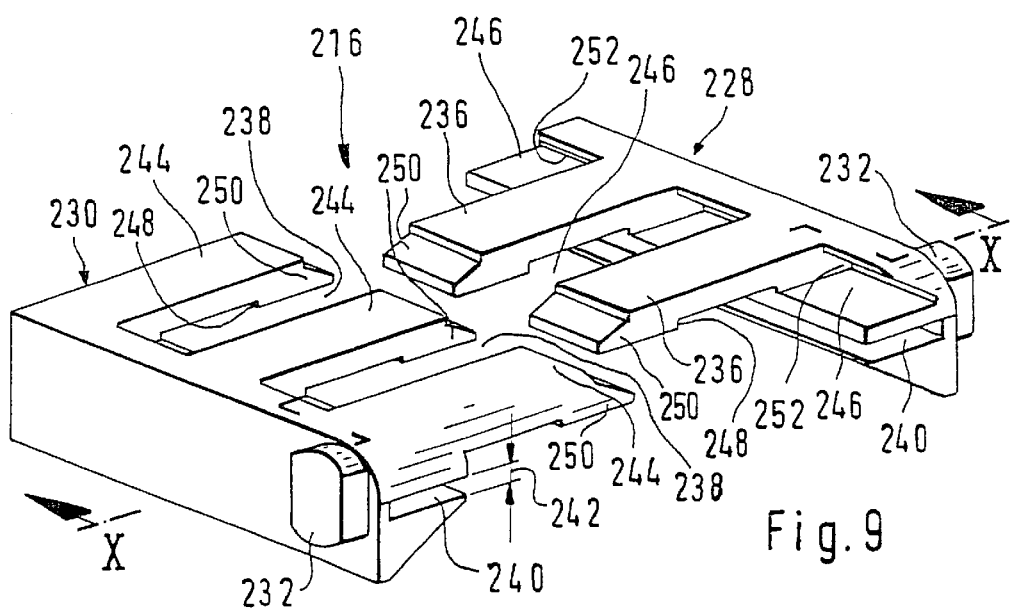
Fig. 9

WIPER BLADE FOR MOTOR VEHICLE WINDOWS

PRIOR ART

In wiper blades for windows of motor vehicles having an elongated, spring-elastic support element for an elongated rubber-elastic wiper element, the support element should assure the most uniform possible distribution of the wiper blade contact pressure, originating in the wiper arm, on the window, over the entire field swept by the wiper blade. By means of a suitable curvature of the unstressed support element—that is, when the wiper blade is not resting on the window—the ends of the wiper strip, which in wiper blade operation are pressed fully against the window, are urged toward the window by the then-tensed support element, even if the radii of curvature of spherically curved vehicle windows vary for every position of the wiper blade. The curvature of the wiper blade must accordingly be somewhat greater than the greatest curvature measured in the wiping field of the window to be wiped. Thus the support element replaces the complicated support bracket construction that has two spring rails disposed on the wiper strip, as in conventional wiper blades (German published, nonexamined patent application DE-OS 15 05 357).

In a known wiper blade (German Patent 12 47 161), the rigid coupling part toward the wiper blade is solidly riveted to the support element, so that the support element is fully reinforced in its center portion. The contact face between the support element and the underside of the coupling part thus extends over the entire length of the coupling part, so that this portion cannot contribute to adapting the wiper strip to the course of the window surface. A teaching similar to the invention can be learned from an exemplary embodiment of the known wiper blade, except that there, no information is provided that the reinforced enter portion of the support element or any provisions for overcoming this drawback.

ADVANTAGES OF THE INVENTION

In the wiper blade of the present invention, a criterion is met that limits the reinforcement of the center portion of the support element to what is still tolerable without major disadvantages.

In a wiper blade in which the joint between the coupling part and the counterpart coupling part has pivot pins guided in bearing recesses, an even better adaptation of the wiper strip to the course of the window surface is attained if the contact face between the support element and the coupling part, measured in the longitudinal direction of the wiper blade, is less than the diameter of the pivot pins.

An optimal adaptation of the wiper strip to the course of the window surface is obtained if the contact face between the support element and the coupling part is equivalent to a line that extends in the direction of the pivot axis and is located inside the projection area of the pivot pins. As a result, the support element does not undergo any stiffening from the coupling part, so that the entire length of the support element can be used for adapting the wiper strip to the course of the window surface.

For proper alignment of the coupling part on the support element, the coupling part has a U-shaped cross section, and the inside of the base of the U forms the underside of the coupling part, and the spacing between the two legs of the U from one another is adapted to the existing maximum width of the support element in the longitudinal center portion of the support element.

In a further feature of the invention, on the free end of each leg of the U, and spaced apart from the underside of the coupling part, attachments oriented in clawlike fashion toward one another, which form bracing means for the support element, are disposed at least in the region of the contact face between the support element and the coupling part. The spacing is dimensioned such that when the curved support element is introduced, it rests on the attachments with its lower band face under tension at two points spaced apart from one another, and that it is braced with the apex region of its upper band face on the underside of the coupling part. This bracing is linear and is oriented crosswise to the longitudinal extent of the support element.

An advantageous embodiment of a support element belonging to the wiper blade that can also, however, be used independently in wiper blades of a different design, provides that the coupling part has a carrier of U-shaped cross section and made of metal, whose outer walls are covered by means of an envelope of U-shaped cross section made from a plastic; and that furthermore pivot pins that belong to the swivel connection between the wiper arm and the wiper blade are disposed on the outer walls of the legs of the U of the envelope. The metal carrier guarantees reliable wiper operation even after a relatively long time in operation, while in the choice of material for the envelope, the demand for wiper blade support on the wiper arm can be taken into account.

If the metal carrier has bending tabs that are joined to the base of its U and that fit over the two longitudinal outer edges of the support element, then the coupling part can be joined in a simple way to the support element, or in other words firmly clamped to it, by means of these bending tabs.

Fastening the plastic envelope to the metal carrier is possible in a simple way by detent locking of the envelope, if the envelope, made of an elastic plastic, protrudes with its legs of the U past the legs of the U of the carrier; and that detent hooks protruding toward one another are disposed on the free ends of the legs of the U of the envelope. In a wiper blade, in which the coupling part is provided with pivot pins, protruding transversely to the longitudinal extent of the wiper blade and belonging to the swivel connection between the wiper arm and the wiper blade, which pivot pins are disposed on the end portion of the coupling part remote from the drive side of the wiper arm, it is possible for a spoiler, for instance, disposed on the side of the support element remote from the window, to be brought with a leading face, facing into the relative wind, to near the pivot connection, which enlarges this leading face and furthermore prevents an unattractive gap from forming between the joint and the spoiler. It is understood that the application of this feature of the invention can be employed independently of the invention, wherever a suitably designed coupling part of the wiper blade is used.

In a wiper blade having a longitudinally split support element, both of whose longitudinal edges toward one another rest in lateral longitudinal grooves of a top strip connected to the wiper strip, the mounting of the coupling part can be accomplished in a simple way if in a further development of the invention, the coupling part is split longitudinally of the support element, and each of the two coupling part halves is provided with a longitudinal groove, oriented toward the respectively other coupling part half, for receiving a longitudinal strip with the longitudinal edges, remote from one another, of the two support element parts, and the two coupling part halves can be joined to one another.

An especially sturdy connection of the two coupling part halves to one another is attained if at least one of the two coupling part halves, made of an elastic plastic, dips with a fingerlike protrusion, fitting over the longitudinal center portion of the support element, into a recess that is present in and associated with the other coupling part half.

To simplify mounting, it is provided that the protrusion is provided, near its free end, with a detent shoulder pointing toward its coupling part half, which shoulder cooperates in detent fashion with the long side, toward it, of the top strip.

The two coupling part halves can no longer be separated unintentionally from one another if a lug disposed on the free end of the protrusion, dips into a recess of the other coupling part half.

An especially stable design of the coupling part is attained if the tongue- or fingerlike protrusions of one coupling part half are provided with lateral splines, with which guide grooves in the other coupling part half are associated.

So that the coupling part cannot be displaced on the support element longitudinally thereof, the support element, in the region of the coupling part, is provided with a lateral protrusion, with which a recess in the inside, toward this side, of the coupling part is associated.

A connection between the wiper blade and the wiper arm that is very reliable in operation is obtained in a wiper blade, which in its longitudinal center portion has two pivot pins, aligned with one another and forming the pivot axis, which are guided in bearing recesses of the wiper arm, if each bearing recess has a mounting channel, each associated with one pivot pin and being open toward the window.

Further advantageous refinements and features of the invention are disclosed in the ensuing description of exemplary embodiments shown in the associated drawing.

DRAWING

In the drawing,

FIG. 1 is a perspective basic view of a wiper blade of the invention and a wiper arm belonging to it and represented by dot-dashed lines;

FIG. 2 is a schematic side view of a wiper blade that has been lifted from the window by a certain extent;

FIG. 7 shows two views and a section of a metal carrier for the plastic envelope of FIG. 6;

FIG. 8 shows a section corresponding to FIGS. 6 and 7 through the put-together coupling part joined to the support element;

FIG. 9 shows a further version of a coupling part, which is split longitudinally and whose two coupling part halves are shown isometrically in a premounting position;

DESCRIPTION OF THE EXEMPLARY EMBODIMENTS

Figure 3:
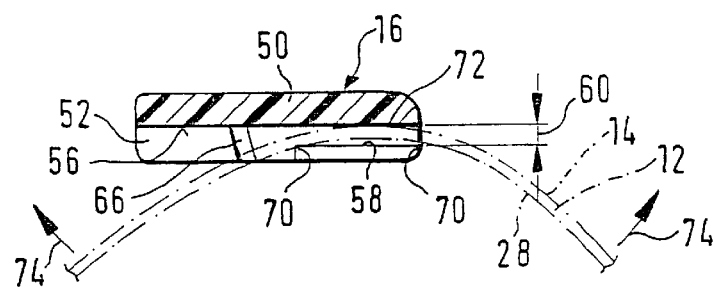
FIG. 3 is a longitudinal section through a coupling part of the blade for pivotable connection of the wiper blade to a counterpart coupling part of the wiper arm, and indicated in dashed lines, a center portion of a support element for a wiper element on which the coupling part is premounted.

A wiper blade 10 shown in FIG. 1 has a bandlike elongated spring-elastic support element 12. On the upper band face or top side 14 of the support element 12, remote from the window to be wiped, a coupling part 16 of the wiper blade is secured, by way of which the wiper blade 10 can be joined to a counterpart coupling part 18, associated with it, of the wiper arm. The counterpart coupling part 18 is solidly joined to a wiper arm 20, one end 22 of which is supported on a motor vehicle body, not shown, where it is driven to swing about a pendulum axis 21. The coupling part 18 of the wiper arm is secured to the other, free end 24 of the wiper arm 20. The two coupling parts 16 and 18 together form a device 26 for attaching the wiper blade 10 to the driven wiper arm 20. The other band face 28 of the support element 12 faces the window 30 to be wiped and is designated the underside of the support element 12. An elongated rubber-elastic wiper element 32 is disposed, with its longitudinal axis parallel, on this underside of the support element 12. The wiper arm 20 and thus the wiper blade 10 joined to it is urged in the direction of the arrow 34 toward the window 30, whose surface to be wiped is represented in FIG. 1 by a dot-dashed line 36. Because the window 30, which as a rule is spherically curved, is not a portion of a spherical surface, the wiper blade 10 must be capable of constantly adapting during its wiper motion (double arrow 38) to the current position of the window surface—refer to the pendulum axis 21—with a swinging motion relative to the wiper arm 20. The connection device 26 is therefore simultaneously embodied as a swivel connection between the wiper blade and the wiper arm. The pivot axes of the wiper arm 20 and the wiper blade 10 are both identified in FIG. 1 by reference numeral 40, because they coincide when the wiper blade has been mounted on the wiper arm. This accordingly common pivot or swing axis extends substantially in the direction of the wiping motion 38.

Since the dot-dashed line 36 is intended to represent the greatest curvature of the window surface, it can be seen clearly from FIG. 2 that the curvature of the wiper blade 10, here resting on the window only with its two ends, is greater than the maximum window curvature. Under the contact pressure (arrow 34 in FIG. 1), the wiper blade presses with a wiper strip, belonging to the wiper element, against the window surface 36 over the entire length of the wiper blade. In this process, a tension builds up in the bandlike spring-elastic support element 12 that assures a proper contact of the wiper element 32, or the wiper strip 42, over its entire length on the vehicle window 30.

The particular embodiment of the wiper blade 10, or the coupling part 16 belonging to it, will now be described in further detail.

Figure 4:
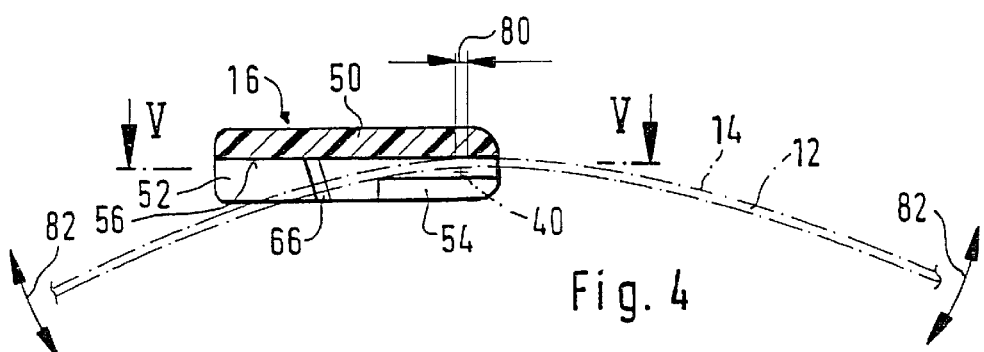
FIG. 4 shows the arrangement of FIG. 3, with the support element in its operating position.
Figure 5:
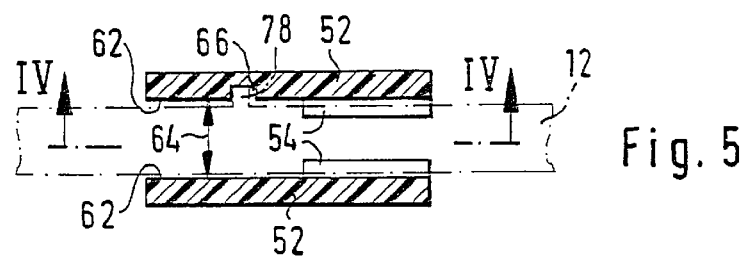
FIG. 5 is a section through the arrangement of FIG. 3 taken along the line V—V.

In a first embodiment of the coupling part 16 in FIGS. 3–5, the coupling part has a substantially U-shaped cross section. Accordingly, it has a base 50 of the U and two legs 52 of the U, which are spaced apart from one another and extend longitudinally of the support element 12 (FIG. 1). In the region of the pivot axis or swing axis 40, clawlike attachments 54 (FIGS. 3–5) are disposed on the free ends of the two legs 52 of the U, aimed at one another via a portion of the coupling part 16. Between the inside 56 of the base 50 of the U and the inside faces 58 facing it of the clawlike attachments 54, a spacing remains, which has been identified by reference numeral 60 in FIG. 3. The extent of the spacing between the two cheeks 62, toward one another, of the legs 52 of the U has been identified by reference numeral 64 in FIG. 5. A groovelike recess 66 is also disposed in one leg 52 of the U; this recess extends substantially in the direction of the spacing 60 and is open toward the other cheek 52. A center portion of the aforementioned support element 12, which in this center portion has its greatest width 68 (FIG. 1) is also shown in dot-dashed lines in each of FIGS. 3–5. The spacing length 64 is adapted to the greatest width 68 of the support element 12 in such a way that the support element is freely movable, properly guided, crosswise to its length. The support element 12 is curved over its entire length in such a way that the center portion of the unstressed support element 12 is farther away from the window 30 than its two end portions (FIG. 2). The curvature is dimensioned such that the support element 12, introduced between the legs 52 of the U, rests with its top side 14 on the inside 56 of the base 50 of the U, while at the same time the underside 28 of the support element 12 is braced in prestressed fashion on the two end edges 70 of the clawlike attachments 54. Thus after the premounting of the support element 12—which joins it then to the wiper element 32—a secure three-point contact of the support element on the two end edges 70 of the attachments 54 and in its apex region 72 on the inside 56 of the base 50 of the U is thus obtained. If from this mounted position (FIG. 4) the wiper blade is placed onto the window 30, the curvature of the support element 12 is lessened; initially, the two ends of the wiper element 32 take on the bracing function of the end edges 70, because the underside 28 of the support element 12 lifts away from this end edges 70, until the wiper element or wiper blade has reached its operating position shown in FIG. 1 and rests over its entire length on the surface 36 to be wiped of the window. The contact face 80 (FIG. 4) between the support element 12 and the underside of the coupling part 16—formed by the inside 56 of the base 50 of the U—corresponds to a line that extends in the direction of the pivot axis 40. The lifting away motion of the support element 12 from the end edges 70 is represented by the arrows 74 in FIG. 3. During this motion, a protrusion 78) projecting laterally from the support element 12) and engaging the groove 66 is also freely movable. However, in cooperation with the side faces of the groove 66, it reliably secures against longitudinal displacement between the support element 12 and the coupling part 16. FIG. 4 further shows that the contact between the support element 12 and the coupling part 16 corresponds to a line whose width—shown exaggerated in the drawing—has been designated by reference numeral 80 in FIG. 4. This contact takes place directly in the region of the pivot axis 40, so that this axis is located inside the projection areas of pivot pins, which are disposed on one of the two coupling parts 16, 18 and can be guided in bearing recesses of the other coupling part 18, 16. In a departure from the embodiment just described and shown in FIGS. 3–5, it is also conceivable to provide the protrusion 78 of the support element 12 at the apex of the support element 12. Because in that case a relative motion between the support element and the coupling part 16 occurs neither in the mounting of the support element nor during wiping operation; it is then possible to provide a round recess, for instance, instead of the groove 66 and the corresponding leg 52 of the U. During the wiping operation, the support element 12 and along with it the wiper strip 42 can be freely resilient over its entire length in the direction of the double arrows 82 and can thus optimally adapt itself to the various curvatures of the window surface 36.

Figure 6:
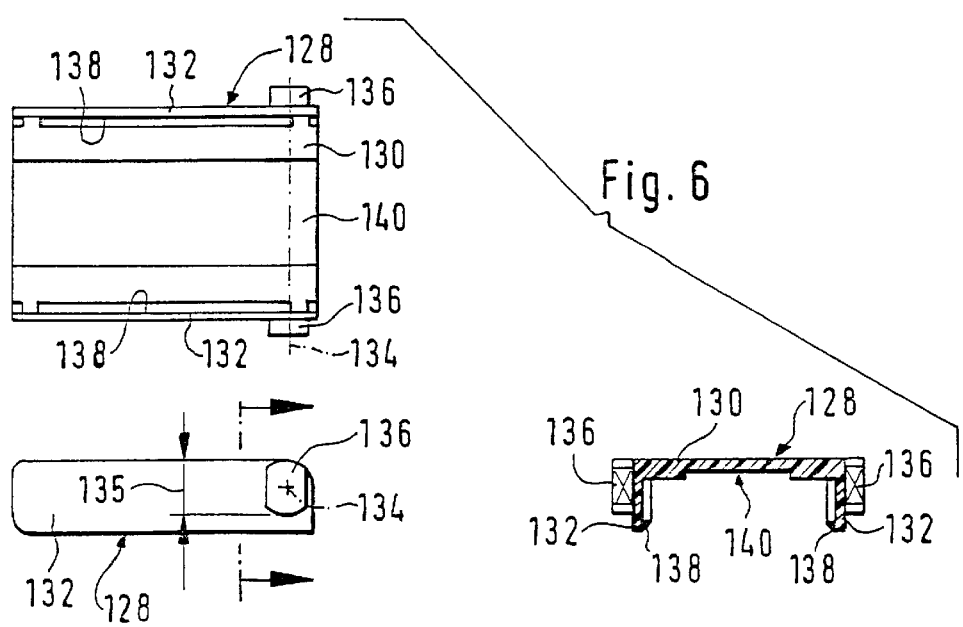
FIG. 6 shows two views and one section of a plastic envelope belonging to a different embodiment of the coupling part.

In FIGS. 6–8, a second embodiment of the coupling part 16 of the wiper blade is shown, identified in FIG. 8 by reference numeral 116. As seen from FIG. 8, the coupling part 116, is made up of two parts. First, it has a carrier 118 (FIG. 7) of U-shaped cross section, made from a metal. Accordingly, this carrier has a base 120 of the U, which changes over to legs 122 extending parallel and spaced apart from one another. The legs 122 of the U extend over a relatively large portion of the length of the carrier 118. Instead of the legs 122 of the U, a bending tab 124 is disposed on one of the carrier 118; like the legs 122, it is integrally joined to the base 120 of the U. The center portion of the base 120 of the U is also provided with a shaped recess 126 extending longitudinally of the carrier 118. The coupling part 116 of the wiper blade also includes an envelope 128 shown in FIG. 6, made of an elastic plastic and acting as a joint, which also has a substantially U-shaped cross section. The base 130 of the U of the envelope 128 is thus adjoined by two legs 132 of the U spaced apart from one another. Pivot pins 136 of non-round cross section are disposed on the outsides of the legs 122 of the U, and are located on a common axis 134. Furthermore, detent hooks 138 oriented counter to one another are provided on the free ends legs 132 of the U of the envelope 128, which protrude past the legs 122 of the U of the carrier 118; these hooks are disposed at a distance from the base of the U that is adapted to the height of the legs 122 of the U of the carrier 118. The envelope 128 made of an elastic plastic can thus be snapped onto the carrier 118 with temporary deflection of its U legs 132, resulting in the mounting position shown in FIG. 8. For receiving the recess 126 of the carrier 118, the inside of the base 130 of the U of the envelope 128 is provided with a corresponding indentation 140. Also shown in FIG. 8 with dot-dashed lines is a cross section through the wiper element 142. In this case, the wiper element 142 has a top strip 143, which is joined to its wiper strip 42 that can be pressed against the window 30. One longitudinal groove is disposed in each of the sides facing away from one another of the top strip 143. The support element, which in the embodiment of FIG. 1 is embodied as a one-piece elongated spring band, is split longitudinally in the version of FIG. 8, resulting in two support element rails 144 forming the support element, which are each seated with one long edge in the grooves that are disposed in the top strip 142. The support element rails 144 together take on the function of the support element. FIG. 8 also shows that the coupling part 116, formed of the carrier 118 and the envelope 128, is seated on the support element rails 144 in such a way that their outer edges, remote from one another, are guided freely movably both on the insides of the legs 122 of the U of the carrier 118 and on the insides facing one another of the bending tabs 124. The striplike portion 148 of the top strip 142 that protrudes past the support element rails 144 is located in the recess 126 in the carrier 118. For securing the coupling part 116 to the support element parts 144, the bending tabs 124 of the carrier 118 are bent in such a way that they fit over the outer edges of the support element rails 144 and rest on the underside of the support element rails (FIG. 8). The connection between the coupling part 116 and the support element 144 is accordingly accomplished solely by the two bending tabs 124. The dimension 125 of the bending tabs 124 measured longitudinally of the support element 144 is designed such that a contact face is obtained between the support element and the coupling part, which is smaller, measured longitudinally of the wiper blade, then the diameter 135 of the pivot pins 136. In this case as well, a very good free mobility of the support element 144 relative to the coupling part 116 is thus obtained. It is illuminating that the fastening of the dual-substance coupling part 116 is not limited to use in support elements that are longitudinally split in two. It is entirely imaginable to use such a coupling part 116 with the use of a bandlike one-piece support element 12 as in FIG. 1, for instance, as well.

Figure 10:
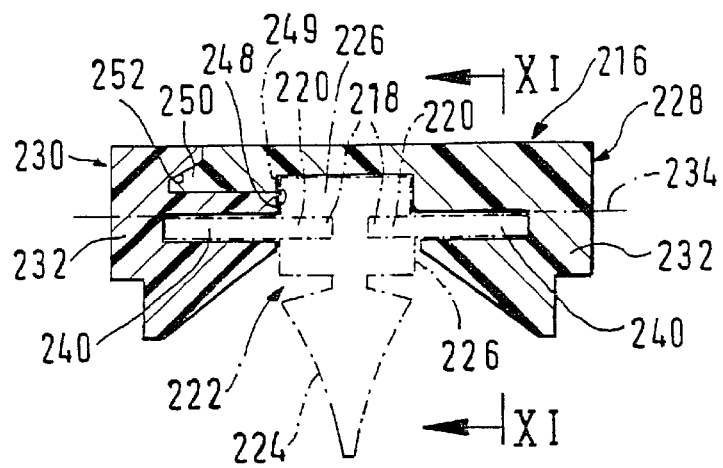
FIG. 10 is a section through the put-together coupling part of FIG. 9, taken along the line X—X of FIG. 9 through a differently embodied coupling part.

An advantageous feature of the coupling part 16 of FIGS. 1–5 is shown in FIGS. 9 and 10. However, in this exemplary embodiment—as in the exemplary embodiment of FIGS. 6–8—the support element 12 is formed by two support element rails 218, which as in the embodiment of FIGS. 6–8 rests with one of their long edges in longitudinal grooves 220 that are disposed in a top strip 226 (FIG. 10) that belongs to the wiper element 222 and is joined to the wiper strip 224. As FIG. 9 shows, the coupling part 216 is split longitudinally of the support element 218. There are accordingly two coupling part halves 228 and 230, each of which is provided on its outside with one pivot pin 232. When the two coupling part halves 228 and 230 are joined together, the two pivot pins 232 have a common pivot axis or swing axis 234 (FIG. 10). In the exemplary embodiment, the coupling part half 228 has two fingerlike protrusions 236, which fit over the longitudinal center axis of the support element 218, and with which recesses 238 present in and associated with the other coupling part half 230 are associated. The two coupling part halves 228 and 230 are made of an elastic plastic. They are each provided with a longitudinal groove 240, oriented toward the respectively other coupling part half, and each groove is provided with long edges, remote from one another, of the support element rails 218 for receiving the outer longitudinal strip. The height 242 (FIG. 9) of the longitudinal grooves 240 is greater than the thickness of the support element rails 218, so that in this embodiment of the coupling part 216 a similar situation is obtained as has been described in conjunction with FIGS. 3–5, if the support element or the two support element rails 218 are correspondingly markedly curved. The disposition of the fingerlike protrusions 236 of the coupling part half 228 and the disposition of the recesses 238 in the coupling part half 230 are made such that corresponding fingerlike protrusions 244 are obtained on the coupling part half 230, with which corresponding recesses 246 in the coupling part half 228 are associated. The various tonguelike or fingerlike protrusions 236 and 244, near their free ends, have a detent shoulder 248, which point toward the respective coupling part half and in the assembled state cooperate in detent fashion with the long side 249 oriented toward this shoulder of the top strip 226, once the two coupling part halves 228, 230 have been joined together and thus hold the two support element rails 218 in their prescribed position in the. longitudinal grooves 220 of the top strip 226. Furthermore, each fingerlike protrusion 236 and 244 has a lug 250, disposed on its free end, which in the assembled state of the two coupling part halves dips into a recess 252 of the other coupling part half. When the two coupling part halves 228 and 230 are joined together, the respective fingerlike protrusions 236 and 244 deflect upward somewhat on crossing the top strip 226. To allow the lugs 250 to reach their recesses 252, the fingerlike protrusions are pressed downward with elastic deformation of the top strip 226, until the lugs 250 are seated in their recesses 252, and the detent shoulders 248 cooperate with the corresponding long sides of the top strip 226. Splitting the support element 218 in two makes it considerably easier to mount it on the support element rails 218—which are already seated in the grooves of the wiper element 222.

Figure 11:
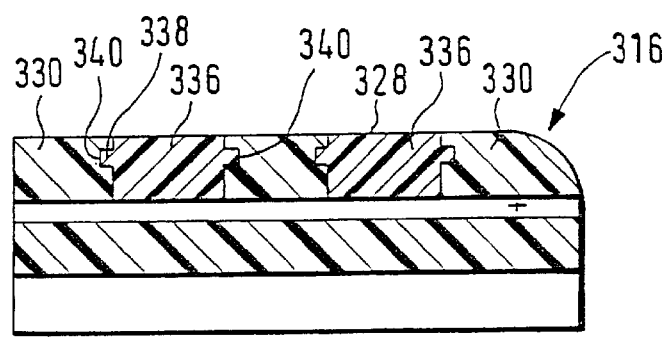
FIG. 11 is a longitudinal section taken along the line XI—XI of FIG. 10 through a differently embodied coupling part.

An especially stable embodiment of the two coupling part halves 328 and 330, forming the coupling part 316, is shown in longitudinal section in FIG. 11, where the tongues 336 of one set of coupling part halves are provided with lateral splines 338, which are guided in guide grooves 340, associated with them, in the region of the recesses 342 of the other coupling part half. Joining together the two coupling part halves 328 and 330 is done in this case with temporary deformation of the top strip 226, because the guide grooves 340 and the splines sliding in them prevent deflection of the fingerlike protrusions.

Figure 12:
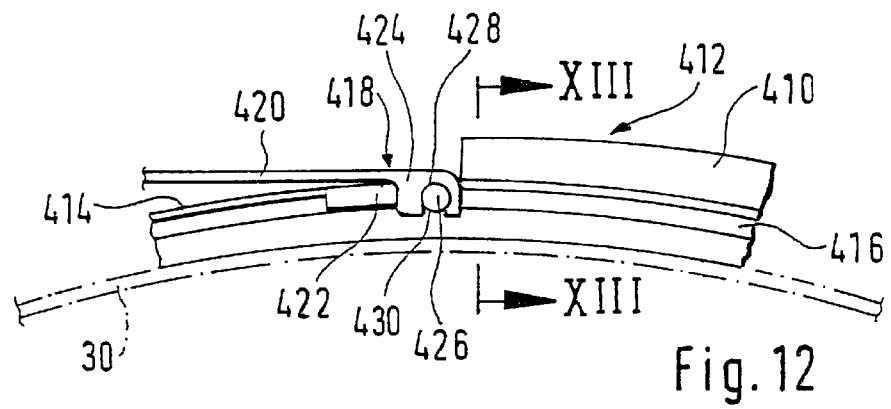
FIG. 12 is a basic illustration in side view of a wiper blade joined to the wiper arm.
Figure 13:
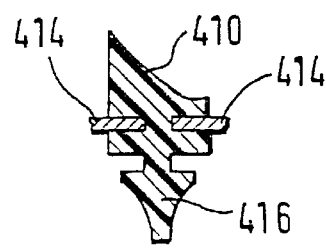
FIG. 13 is a section through the wiper blade of FIG. 12 taken along the line XIII—XIII.

The fragmentary side view, shown in FIG. 12, of a wiper blade 412 provided with a so-called spoiler 410 again has a bandlike support, element 414, on whose underside toward the window there is a wiper strip 416. The spoiler 410 (FIG. 13) is located on the top side of the support element 414; the spoiler acts a wind deflection strip for the relative wind, which assures a proper contact pressure of the wiper strip 416 on the window to be wiped, even at high vehicle speeds. As in the exemplary embodiments already described above, the wiper blade 412 is equipped in its center portion with a connection device 418, which serves to join the wiper blade 412 to the driven wiper arm 420. As already described in conjunction with FIG. 1, the connection device has a coupling part 422 of the wiper blade and a counterpart coupling part 424 of the wiper arm, cooperating with the coupling part. The coupling part 422 of the wiper blade likewise has two coaxial pivot pins 426, which are guided in bearing recesses 428 of the coupling part 424 of the wiper arm. The two pivot pins 426 are disposed as close as possible to the end portion, facing away from the power takeoff side of the wiper arm 420, of the coupling part 422 of the wiper blade, so that the spoiler 410 can be guided close to the pivot axis or swing axis.

A characteristic that can be seen from FIG. 12 is of general and particular importance; it can be employed even independently of the embodiments of the invention that are described and shown here. The two pivot pins 426, disposed in the longitudinal center portion and protruding from the long sides of the wiper blade, are introduced, from mounting the pivot connection between the wiper arm 420 and the wiper blade 418, into their bearing recesses 428 of the wiper arm via mounting channels 430; these bearing recesses are opened, beginning at the recesses, toward the window 30 to be wiped. The wiper blade contact pressure (arrow 34) assures an operationally reliable pivot connection, which can be undone itself only after the wiper blade has been intentionally lifted away from the window. It does not matter whether the pivot connection is embodied as a so-called insert and twist connection—with a non-round peg cross section—or as a detent connection.

It is a common feature of all the exemplary embodiments that the support element 12 or 144 or 218 is curved over its entire length in such a way that the center portion of the support element, pressed without stress on the window 30, is farther away from the window than its two end portions, and that the contact face between the support element and the underside of the coupling part, measured longitudinally of the wiper blade, is less than 1.5 times the maximum width of the support element.

It will be understood that each of the elements described above, or two or more together, may also find a useful application in other types of constructions differing from the types described above.

While the invention has been illustrated and described herein as a wiper blade for windows of motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A wiper blade for windows of motor vehicles, comprising a spring-elastic support element which has a longitudinal extension and along the longitudinal extension has a lower and an upper band surface; a wiper element arranged on the lower band surface of the support element; a first coupling part arranged on the upper band surface of the support element and having an underside arranged on the upper band surface on and over a contact face and also having claw-shaped attachments which engage the support element, said first coupling part being cooperatable with a second coupling part belonging to a wiper arm, the support element along its longitudinal extension being curved so that in unstressed condition of the wiper blade the contact face of the underside of the first coupling part on the upper band surface of the support element in direction of the longitudinal extension is smaller than 1.5 times of the maximal width of the support element, and the support element in addition to the contact face is also supported on the claw-shaped attachments with prestress so that the support element is movable under the first coupling part relative to said underside of said first coupling part.

2. A wiper blade as defined in claim 1, wherein the first coupling part has a U-shaped cross-section with a base and legs, and an inner side of the base forms the underside of the first coupling part, while a distance between the legs is selected in accordance with a width of the support element so that the support element is unobjectionably guided and is freely movable.

3. A wiper blade as defined in claim 1, wherein the first coupling part is provided with pivot pins which belong to a pivot connection between the wiper arm and the wiper blade, the pivot pins being arranged on an end portion of the first coupling part which faces away from a power take off of the wiper arm.

4. A wiper blade as defined in claim 1, wherein the support element is subdivided in a longitudinal direction and has longitudinal edges which face toward one another, the first coupling part being split in the longitudinal direction of the support element and each of two coupling part halves being provided with a longitudinal groove facing a longitudinal groove of another coupling part half for receiving a longitudinal strip with longitudinal edges of both support element parts facing away from one another, and both coupling part halves being connectable with one another.

5. A wiper blade as defined in claim 4, wherein at least one of the coupling part halves composed of an elastic plastic is introduced, by a finger-shaped protrusion which overlaps a longitudinal central axis of the support element, in an associated recess of another coupling part half.

6. A wiper blade as defined in claim 5, wherein the protrusion near its free end is provided with an arresting shoulder which faces its coupling part half, and the arresting shoulder cooperates with an associated longitudinal side of a top strip in an arresting manner.

7. A wiper blade as defined in claim 5, wherein the protrusion at a free end has a lug which is introduced into a recess of the upper coupling part half.

8. A wiper blade as defined in claim 5, wherein the protrusions of one of the coupling part halves are formed as protrusions selected from the group consisting of tongue-shaped protrusions and finger-shaped protrusions and are provided with lateral splines associated with guide grooves of another coupling part half.

9. A wiper blade as defined in claim 1, wherein the support element in a region of the first coupling part is provided with a lateral protrusion which is associated with a recess provided on an inner side of the coupling part facing this side.

10. A wiper blade as defined in claim 1; and further comprising pivot pins forming a pivot axis, the pivot pins being guidable in bearing recesses of the wiper arm, each bearing recess being provided with a mounting passage which opens toward a window and is associated with a respective pivot pin.

11. A wiper blade for windows of motor vehicles, comprising a spring-elastic support element which has a longitudinal extension and along the longitudinal extension has a lower and an upper band surface; a wiper element arranged on the lower band surface of the support element; a first coupling part arranged on the upper band surface of the support element and having an underside arranged on the upper band surface on and over a contact face and also having claw-shaped attachments which engage the support element, said first coupling part being cooperatable with a second coupling part belonging to a wiper arm, the support element along its longitudinal extension being curved so that in unstressed condition of the wiper blade the contact face of the underside of the first coupling part on the upper band surface of the support element in direction of the longitudinal extension is smaller than 1.5-times of the maximal width of the support element, and the support element in addition to the contact face is also supported on the claw-shaped attachments with prestress, wherein the first coupling part has at least one pivot pin, and the contact face in the longitudinal extension of the wiper blade is smaller than the diameter of the at least one pivot pin.

12. A wiper blade as defined in claim 11, wherein the contact face between the support element and the first coupling part corresponds to a line which extends in direction of a pivot axis located inside a projection surface of the pin.

13. A wiper blade for windows of motor vehicles, comprising a spring-elastic support element which has a longitudinal extension and a along the longitudinal extension has a lower and an upper band surface, a wiper element arranged on the lower band surface of the support element; a first coupling part arranged on the upper band surface of the support element and having an underside arranged on the upper band surface on and over a contact face and also having claw-shaped attachments which engage the support element, said first coupling part being cooperatable with a second coupling part belonging to a wiper arm, the support element along its longitudinal extension being curved so that in unstressed condition of the wiper blade the contact face of the underside of the first coupling part abuts against the upper band surface of the support element in direction of the longitudinal extension, the support element in addition to the contact face is also supported on the claw-shaped extensions; the first coupling part has a U-shaped support composed of metal and having outer walls; a U-shaped envelope composed of plastic and covering the outer walls of the support; and pivot pins arranged on the outer walls of legs of the envelope.

14. A wiper blade as defined in claim 13, wherein the metal support has bending parts connected to a base and engaging both longitudinal outer edges of the support element.

15. A wiper blade as defined in claim 13, wherein the envelope composed of plastic has legs extending outwardly beyond legs of the support; and further comprising arresting hooks arranged on free ends of the legs of the envelope and prestressing them relative to one another.

16. A wiper blade as defined in claim 13, wherein the support element in a region of one of the coupling parts is provided with a lateral protrusion, and is associated with a recess provided on an inner side of the coupling part facing this side.

17. A wiper blade (10) for windows (30) of motor vehicles, having an elongated, spring-elastic support element (12) for an elongated rubber-elastic wiper element (32) that can be pressed against the window and is disposed on a lower face of the support element (12) oriented toward the window and longitudinally parallel to the support element, and having a first coupling part (16) with a flat underside positioned on an upper face of the support element remote from the window for pivotably connecting the wiper blade (10) to a second coupling part (18) belonging to a reciprocatingly driven wiper arm (20), in which a pivot axis (40) located in a longitudinal center portion of the support element is disposed substantially transversely to a longitudinal extension of the wiper blade (10), and the first coupling part (16) with its flat underside is oriented toward the upper face of the support element, characterized in that the support element (12) is curved over its entire length such that the longitudinal center portion of the support element (12), resting unstressed on the window (30), is farther away from the window than two end portions of the support element (12), and that a contact face (80) between the support element (12) and the underside of the coupling part (116), measured in a longitudinal direction of the wiper blade, is less than 1.5 times a maximum width (68) of the support element (12), that a joint (128) disposed between the first coupling part (16) and the second coupling part (18) has pivot pins (136) guided in bearing recesses, and that the contact face between the support element (12) and the first coupling part (16), measured in the longitudinal direction of the wiper blade, is less than a diameter of the pivot pins.

18. A wiper blade (10) for windows (30) of motor vehicles, having an elongated, spring-elastic support element (12) for an elongated rubber-elastic wiper element (32) that can be pressed against the window and is disposed on a lower face of the support element (12) oriented toward the window and longitudinally parallel to the support element, and having a first coupling part (116) with a flat underside positioned on an upper face of the support element remote from the window for pivotably connecting the wiper blade (10) to a second coupling part (18) belonging to a reciprocatingly driven wiper arm (20), in which a pivot axis (40) located in a longitudinal center portion of the support element is disposed substantially transversely to a longitudinal extension of the wiper blade (10), and the first coupling part (116) with its flat underside is oriented toward the upper face of the support element, characterized in that the support element (12) is curved over its entire length such that the longitudinal center portion of the support element (12), resting unstressed on the window (30), is farther away from the window than two end portions of the support element (12), and that a contact face (80) between the support element (12) and the underside of the first coupling part (116), measured in a longitudinal direction of the wiper blade, is less than 1.5 times a maximum width (68) of the support element (12), that a joint (128) disposed between the first coupling part (116) and the second coupling part (18) has pivot pins (136) guided in bearing recesses, and that the contact face (80) between the support element (12) and the first coupling part extends in a direction of the pivot axis (40).

19. A wiper blade (10) for windows (30) of motor vehicles, having an elongated, spring-elastic support element (12) for an elongated rubber-elastic wiper element (32) that can be pressed against the window and is disposed on a lower face of the support element (12) oriented toward the window and longitudinally parallel to the support element, and having a first coupling part (16) with a flat underside positioned on an upper face of the support element remote from the window for pivotably connecting the wiper blade (10) to a second coupling part (18) belonging to a reciprocatingly driven wiper arm (20), in which a pivot axis (40) located in a longitudinal center portion of the support element is disposed substantially transversely to a longitudinal extension of the wiper blade (10), and the first coupling part (16) with its flat underside is oriented toward the upper face of the support element, characterized in that the support element (12) is curved over its entire length such that the longitudinal center portion of the support element (12), resting unstressed on the window (30), is farther away from the window than two end portions of the support element (12), that a contact face (80) between the support element (12) and the underside of the first coupling part (16), measured in a longitudinal direction of the wiper blade, is less than 1.5 times a maximum width (68) of the support element (12), that the first coupling part (16) has a substantially U-shaped cross-section, said first coupling part (16) having a base (50) and two legs (52) to form the U-shaped cross-section, said support element (12) introduced between the legs (52) of the first coupling part (16), wherein attachments (54) are disposed on free ends of said legs (52) proximate to said pivot axis, and that the support element (12) has a curvature whereby a top side (14) of the support element (12) rests on an inside portion (56) of the base (50) while an underside (28) of the support element (12) is simultaneously braced in a prestressed fashion on end edges (70) of the attachments (54).

* * * * *